United States Patent [19]

Ueda et al.

[11] Patent Number: 5,254,512
[45] Date of Patent: Oct. 19, 1993

[54] METHOD FOR TREATING GAS AND REGENERATING CATALYST PORTION BY PORTION

[75] Inventors: Kanji Ueda; Yoshinori Takata; Tadaichi Shibahara; Yoshinori Yoshida, all of Hyogo, Japan

[73] Assignee: Sumitomo Seika Chemicals Co., Ltd., Hyogo, Japan

[21] Appl. No.: 796,354

[22] Filed: Nov. 22, 1991

[30] Foreign Application Priority Data

Nov. 28, 1990 [JP] Japan .................. 2-332340
Jul. 2, 1991 [JP] Japan .................. 3-188093

[51] Int. Cl.$^5$ .................. B01J 38/14; B01J 38/04; B01J 20/34; B01D 53/36
[52] U.S. Cl. .................. 502/52; 422/4; 422/5; 422/178; 422/180; 422/223; 423/245.1; 502/34; 502/38
[58] Field of Search ........... 502/34, 38, 49, 52–55; 423/245.1; 55/74; 422/4, 5

[56] References Cited

U.S. PATENT DOCUMENTS

| | | | |
|---|---|---|---|
| 2,916,360 | 12/1959 | Nicholl | 502/48 |
| 2,934,495 | 4/1960 | Worth | 502/45 |
| 4,418,046 | 11/1983 | Izumo et al. | 423/245.1 |
| 4,420,313 | 12/1983 | Hada | 423/239 |
| 4,770,857 | 9/1988 | Ludwig | 422/111 |
| 4,834,962 | 5/1989 | Ludwig | 423/351 |

FOREIGN PATENT DOCUMENTS

| | | |
|---|---|---|
| 0080125 | 6/1983 | European Pat. Off. |
| 0194430 | 9/1986 | European Pat. Off. |
| 0361385 | 4/1990 | European Pat. Off. |
| 0431648 | 6/1991 | European Pat. Off. |
| 2729345 | 1/1978 | Fed. Rep. of Germany |
| 4003668 | 8/1990 | Fed. Rep. of Germany |

OTHER PUBLICATIONS

J. Chem. Soc. (1986) 1986-pp. 1007–1017 "Regeneration of Pentasil Zeolite Catalyst Using Ozone and Oxygen" R. G. Cooperthwaite et al.

*Primary Examiner*—Paul E. Konopka

[57] ABSTRACT

A method for continuously treating a gas using an apparatus with a catalyst bed housed therein comprises the steps of passing a subject gas through the catalyst bed to adsorb the adsorbable substances in the subject gas thereto; and passing a regenerating gas through the catalyst bed adsorbed by the adsorbable substances in the subject gas to react and decompose them and simultaneously regenerate the catalyst bed. A particular apparatus is used with this method.

By carrying out this method of the present invention using the gas treating apparatus, it is possible to continuously, efficiently and economically advantageously treat a gas containing a malodorous component, harmful component, organic solvent, hydrocarbon vapor or the like.

14 Claims, 9 Drawing Sheets

METHOD FOR TREATING GAS AND REGENERATING CATALYST PORTION BY PORTION

FIELD OF THE INVENTION

The present invention relates to a method for treating a malodorous gas or gas containing a harmful component and an apparatus used therefor.

BACKGROUND OF THE INVENTION

Traditionally, gases containing a malodorous component, harmful component, organic solvent, hydrocarbon vapor or the like (hereinafter referred to as the subject gas) have been treated by a number of methods, including the direct combustion method, in which the subject gas is oxidized at a high temperature of 600° to 1000° C., the catalytic oxidation method, in which the subject gas is oxidized at relatively low temperature in the presence of catalyst, the adsorption method, which uses an adsorbent such as activated charcoal, silica gel, activated alumina, activated clay or zeolite, and the absorption method, in which an absorbent solution is used to physically or chemically absorb and eliminate malodorous and other undesirable components.

However, the direct combustion method requires a lot of fuel and increases running cost when the combustible substance concentration in the subject gas is low. The catalytic oxidation method also requires a lot of energy for heating to raise a temperature of the entire subject gas when the oxidizable substance concentration in the subject gas is low. For these reasons, there has recently been carried out the method in which the malodorous and combustible substance is once adsorbed to adsorbent and then desorbed with a small amount of heating gas to take it out as a concentrated combustible gas, which is then oxidatively decomposed in a separately installed catalytic reaction apparatus. In this case, however, cost is high and a large area of installing space is required because two apparatuses are necessary, namely an apparatus for concentration by adsorption-desorption and a catalytic reaction apparatus. As for the adsorption method and the absorption method, either of them is unsatisfactory because the deactivated adsorbent or absorbent solution must be regenerated using a separate apparatus or disposed.

On the other hand, there have recently been investigated the direct ozonic oxidation method, in which ozone is used to oxidize malodorous components etc. in vapor phase at room temperature or at a temperature lower than that used for the conventional catalytic oxidation method, and the ozonic catalytic oxidation method, in which ozone and a catalyst are used in combination. These ozonic oxidation methods draw much attention as methods for treating the subject gas because they have many advantages; for example, the desired effect is obtained with only a trace amount of ozone, the starting material is air and is easy to supply, and a fungicidal effect is expected in addition to the oxidizing effect. However, even the ozonic catalytic oxidation method, which is appreciated as a method with excellent oxidative decomposition performance, can undergo degradation of its oxidative decomposition performance due to accumulation of a high boiling, difficult-to-decompose compound such as phenol or a decomposition product thereof when treating them at room temperature. Another problem is that even in the case of a compound which is treatable at room temperature, catalyst exchange or regeneration must be made in long term use since the oxidative decomposition performance declines due to accumulation of trace amounts of undecomposed components, though the oxidative decomposition performance can be kept intact in short term use.

SUMMARY OF THE INVENTION

Taking note of the background situation described above, the present inventors made investigations to develop a method for efficiently and economically advantageously treating the subject gas containing a malodorous component, harmful component, organic solvent, hydrocarbon vapor or the like. As a result, the inventors found that the adsorbable substances adsorbed to catalyst bed can be completely oxidized and decomposed by catalytic action and the catalyst bed can be regenerated at the same time by passing the subject gas through the catalyst bed to adsorb the adsorbable substances in the subject gas thereto and subsequently passing a high temperature reaction regenerating gas through the catalyst bed.

The inventors also found that more complete oxidization and decomposition can be carried out by adding an ozone to the subject gas to decompose a part of the adsorbable substances in the subject gas by ozonic oxidation and then by passing the ozone-supplemented subject gas through the catalyst bed to adsorb the undecomposed adsorbable substances thereto and subsequently by passing a high temperature reaction regenerating gas. As a result a catalyst bed exchange is unnecessary because the catalyst bed can be regenerated at the same time, and that the adsorbable substances in the subject gas can be continuously, efficiently and economically advantageously decomposed and removed because there is no need for a separate apparatus for regeneration. The inventors made further investigations based on these findings, and developed the present invention.

The reaction regenerating gas (hereinafter referred to as regenerating gas) means the reaction gas to decompose adsorbed substances and simultaneously regenerate the catalyst.

Accordingly, the present invention relates to a method for continuously treating a gas using an apparatus with a catalyst bed housed therein, in which the subject gas or ozone-supplemented subject gas is passed through the catalyst bed to adsorb the adsorbable substances in the subject gas and a regenerating gas is passed through the catalyst bed adsorbed by the adsorbable substances therein to react and decompose them and simultaneously regenerate the catalyst bed, characterized in that the regenerating portion to pass the regenerating gas therethrough constitutes a part of the catalyst bed and the entire catalyst bed is regenerated while the regenerating portion periodically moves from portion to portion in the catalyst bed, and an apparatus used for this method. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 14(A) and 14(B) show a schematic diagram of a cross sectional view of FIG. 13 on the A—A line (A) and a schematic diagram of the flow of regenerating gas and high concentration ozone and/or oxygen on a cross portion of FIG. 13 on the B—B line (B).

Figure 1:
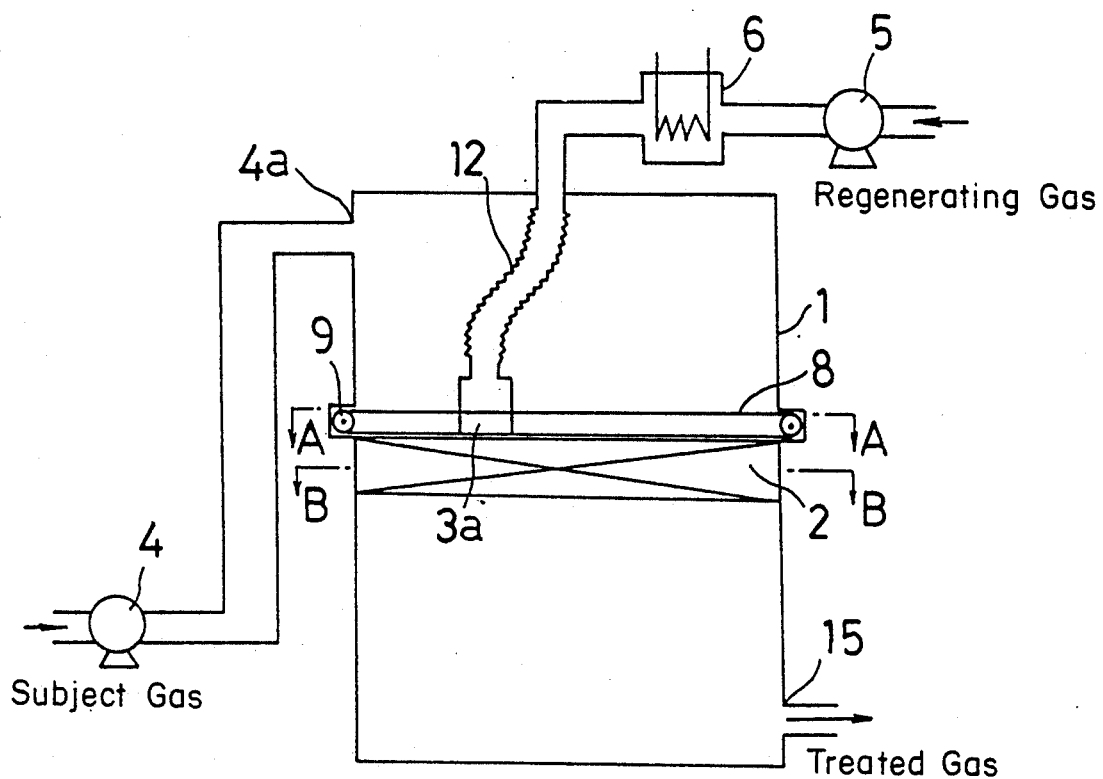
FIG. 1 is a schematic diagram of a treating apparatus incorporating a square catalyst bed.

The numerical symbols in these figures are as follows:
1: chamber, 2: catalyst bed, 3: regenerating portion, 3a: blowing hole for regenerating gas, 4: subject gas blower, 4a: subject gas inlet, 5: regenerating gas blower, 6: regenerating gas heater, 7: driving mechanism, 8: timing belt, 9: timing pulley, 10: sealing, 11: bearing, 12: flexible tube, 13: inlet of high concentration ozone and-/or oxygen, 13a: blowing slit for high concentration ozone and/or oxygen, 13b: blowing portion of high concentration ozone and/or oxygen, 14: reversion portion of regenerating gas, 14a: reversion pan, 15: treated gas outlet.

DETAILED DESCRIPTION OF THE INVENTION

The treating method of the present invention is characterized in that a heated regenerating gas is passed through a part of catalyst bed to form a regenerating portion in the catalyst bed, and the adsorbable substances adsorbed thereto are decomposed and removed and the catalyst in the regenerating portion is regenerated at the same time. This regenerating portion is a section of the catalyst bed, where the heated regenerating gas is passing, and moves portion to portion in the catalyst bed sequentially and periodically. The direction of motion may be rotational around the center of the catalyst bed when the catalyst bed is circular as seen from the direction of flow of the subject gas, or may be sliding along the catalyst bed when the catalyst bed is square. The regenerating portion may be moved by the method in which the blowing hole for regenerating gas moves above the catalyst bed or by the method in which the blowing hole for regenerating gas is fixed and the catalyst bed is moved.

The regenerating portion thus formed by passing a heated regenerating gas through the catalyst bed moves sequentially all over the catalyst bed to uniformly regenerate the catalyst bed and then returns to the starting position.

The direction of flow of regenerating gas may be the same as the direction of flow of the subject gas or may be opposite thereto.

When the direction of flow of regenerating gas is opposite to the direction of flow of the subject gas, it is necessary to keep the flow rate of regenerating gas sufficiently greater than the flow rate of the subject gas. In this case, the adsorbable substances adsorbed to the catalyst bed are desorbed while being heated and decomposed by the regenerating gas and once pass through the catalyst bed along with the regenerating gas and return to the opposite side, i.e., the subject gas inlet side, where they are mixed with the subject gas and again pass through the catalyst bed; therefore, this case is advantageous from the viewpoint of decomposition of adsorbable substances.

Moreover, in the method in which the regenerating gas is blown to the catalyst bed in the direction opposite to the direction of the subject gas, when the regenerating gas is blown to the catalyst bed and passed through the catalyst bed, after which its flow direction is reversed to the same direction as the direction of flow of the subject gas by a reversion pan provided at the opposite side of the catalyst bed to the blowing hole for regenerating gas, which moves along with the blowing hole. A good effect is obtained because the adsorbable substances adsorbed to the catalyst bed can be more completely decomposed by passing again regenerating gas through the catalyst bed without being mixed with the subject gas and hence without decline in gas temperature.

Providing such a reversion pan is advantageous because it reduces the volume of regenerating gas used and makes it possible to decompose the adsorbable substances and regenerate the catalyst bed with high efficiency. The cross sectional area of the reversion pan is suitable 2 to 20 times the cross sectional area of the blowing hole for regenerating gas. If it exceeds 20 times, no significant effect is obtained from reversion of regenerating gas.

The regenerating gas used is air, an exhaust gas resulting from decomposing treatment of adsorbable substances or a gas obtained by enriching these gases with ozone and/or oxygen which are each heated to 100° to 500° C., preferably 150° to 400° C. Temperatures under 100° C. do not offer complete decomposition of adsorbable substances; heating to over 500° C. requires a lot of fuel and does not offer a corresponding effect.

The degree of enrichment of ozone enriched and/or oxygen enriched gas is not less than 1 ppm for ozone, preferably 10 ppm to 5%, and not less than 22% for oxygen, preferably 23% to 99%. It is possible to use high concentration ozone generated from ozone generator and high concentration oxygen generated from a cylinder or oxygen PSA (Pressure Swing Adsorption) apparatus.

It is economical to use a heated gas as a regenerating gas and pass it through the regenerating portion as a part of the catalyst bed because it is unnecessary to heat the entire subject gas or the entire catalyst bed and it is possible to save heat energy for gas heating. When heated air or the exhaust gas resulting from decomposition and treatment of adsorbable substances is used as a regenerating gas in combination with ozone and/or oxygen, it is more effective and efficient to introduce the latter gas at high concentration to a position close to the catalyst bed through a feeding pipe and blow it to a part of the regenerating portion in the catalyst bed because the ozone and/or oxygen is blown to the catalyst bed while being kept at high concentration. Here, a position close to the catalyst bed means that the distance from the catalyst bed is normally not longer than about 30 mm, preferably not longer than 10 mm, and more preferably not longer than 5 mm.

Thus, in the present invention, there are two methods for preparing ozone-enriched and/or oxygen-enriched gas as a regenerating gas; one is to previously mix air or the exhaust gas described above with ozone and/or oxygen, and another is to introduce the high concentration ozone and/or oxygen to the catalyst bed directly through a feeding pipe separately from the blowing of air or the exhaust gas.

When an ozone-enriched gas is used as a regenerating gas, better results are obtained by the method in which high concentration ozone is introduced to a position close to the catalyst bed through a feeding pipe and blown at high concentration, since ozone is not thermally stable and can be decomposed upon heating to lose its effect.

When the regenerating gas is blown in the direction opposite to the direction of the subject gas, the position to which the high concentration ozone and/or oxygen is introduced through a feeding pipe may be on either of the regenerating gas side or the subject gas side, as long as it is close to the regenerating portion of the catalyst bed. When a reversion pan which moves along with the blowing hole for regenerating gas is provided to reverse the direction of the regenerating gas, the position to which the high concentration ozone and/or oxygen is introduced through a feeding pipe may be at the inside of the reversion pan.

The exhaust gas thus resulting from decomposing treatment of adsorbable substances is purged through the treated gas outlet.

With respect to the catalyst bed, it is advantageous for feeding the gas to use a catalyst bed comprising a honeycomb-like base carrying a catalyst or a catalyst bed comprising cells partitioned in parallel to the direction of flow of the gas and filled with grains or balls of catalyst because the flow resistance is lowered.

A conventional oxidation catalyst is used in the catalyst bed. Examples of such catalysts include platinum, palladium, cobalt, nickel, chromium, manganese, vanadium, tungsten, molybdenum, iron, lead, copper and oxides thereof. These catalysts may be used singly or in combination.

Examples of adsorbable substances in the subject gas which can be treated by the present invention include malodorous compounds and harmful compounds, specifically sulfides such as methyl mercaptan, amines such as ammonia, methylamine, dimethylamine, trimethylamine, ethylamine, diethylamine, triethylamine, isobutylamine and pyridine, ketones such as methyl ethyl ketone and cyclohexanone, organic acids such as acetic acid, butyric acid and propionic acid, aldehydes such as formaldehyde, acetaldehyde and acrolein, phenols such as phenol and cresol and alcohols such as methanol and butanol.

The method for treating a gas of the present invention is applicable when the concentration of these malodorous compounds and harmful compounds in the subject gas ranges from 0.1 to 500 ppm by volume.

The flow volume, flow rate, retention time in catalyst bed and other factors of the subject gas are determined as appropriate according to the kind and concentration of components in the subject gas. The same applies to regenerating gas. Also, when ozone is added to the subject gas beforehand, the ozone concentration is normally not less than 0.1 ppm and preferably not less than 1 ppm and is determined as appropriate according to the kind and concentration of components in the subject gas.

The size of catalyst bed, the amount of catalyst used, the cycle of rotation, sliding and other motions of the blowing hole for regenerating gas and other factors are also determined as appropriate according to the flow volume and flow rate of the subject gas and the kind and concentration of components in the subject gas.

As stated above, the treating method of the present invention makes it possible to simultaneously and continuously perform decomposition of adsorbable substances in the subject gas and regeneration of the catalyst bed; therefore, there is no need for catalyst bed exchange or separate apparatus for regeneration and thus efficient and continuous operation is possible.

Another mode of the present invention is an apparatus for treating the subject gas containing such a malodorous compound or harmful compound.

To explain the apparatus of the present invention, some examples thereof are given in FIGS. 1 through 16.

Figure 2A:
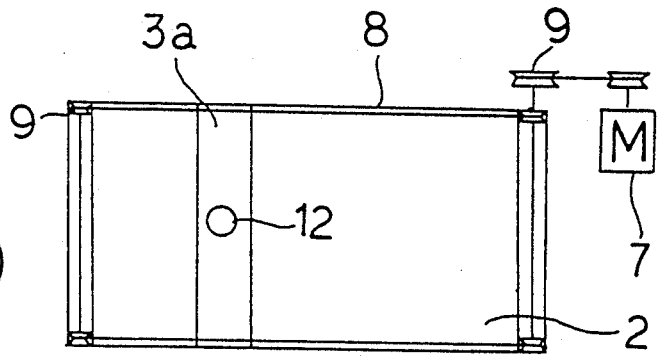
FIGS. 2(A) and 2(B) are schematic diagrams of cross sectional views of FIG. 1 on the A—A line (A) and the B—B line (B)
Figure 2B:
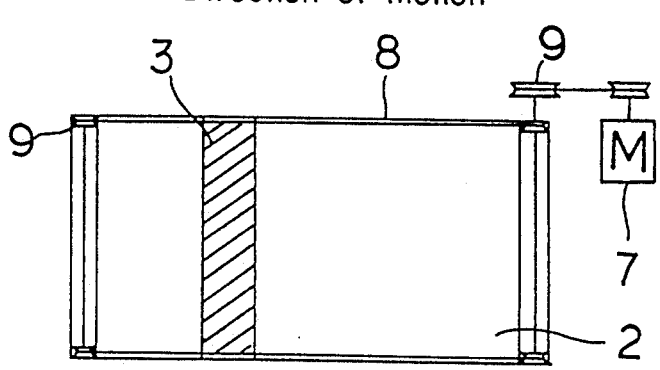

FIG. 1 exemplifies the use of a square catalyst bed 2, in which the regenerating gas is blown to the catalyst bed 2 while moving the blowing hole for regenerating gas 3a above the regenerating portion 3 for sequential regeneration. The regenerating gas transferred from the regenerating gas blower 5 passes through the movable flexible tube 12 and is blown to the catalyst bed 2 through the blowing hole for regenerating gas, while the blowing hole for regenerating gas 3a is periodically sliding left and right above the catalyst bed. FIGS. 2(A) and 2(B) are schematic diagrams of a cross sectional view of the treating apparatus of FIG. 1 on the A—A line (A), in which the sliding direction of regenerating portion 3 which moves along with the blowing hole 3a is shown by arrow (B).

Figure 3:
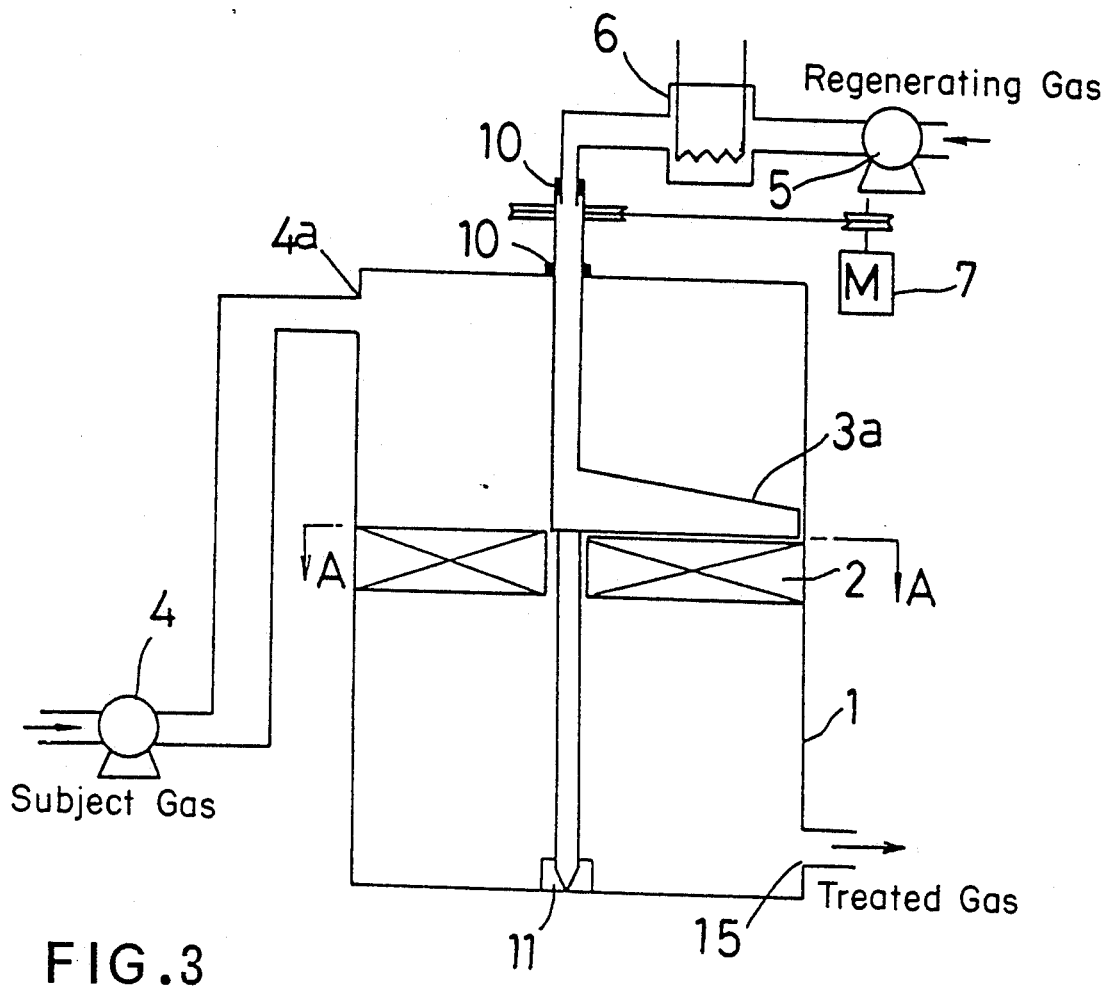
FIG. 3 is a schematic diagram of a treating apparatus incorporating a circular catalyst bed.
Figure 4:
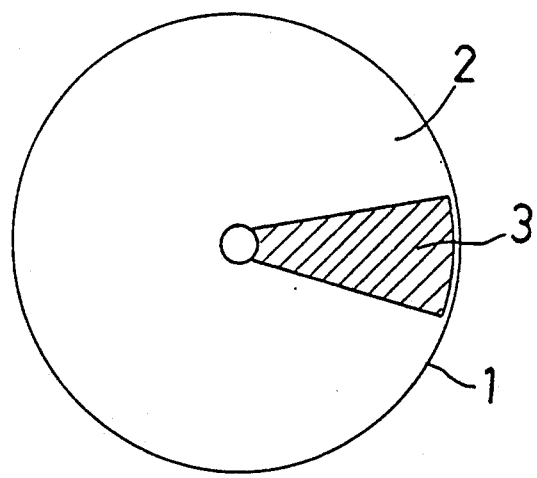
FIG. 4 is a schematic diagram of a cross sectional view of FIG. 3 on the A—A line.

FIG. 3 exemplifies the use of a circular catalyst bed 2, in which the blowing hole for regenerating gas 3a periodically rotates around the center of the catalyst bed 2 above the catalyst bed. The blowing hole for regenerating gas 3a covers partly the catalyst bed 2. The regenerating portion 3 has a fan-like form as illustrated in the schematic diagram of a cross sectional view on the A—A line in FIG. 4; its size can be set at any level, but is normally ¼ to 1/200, preferably 1/10 to 1/20 of the area of the catalyst bed, and its number of portion may be 1 or 2 or more. When the subject gas is supplied from the lower part of the chamber 1 and flow from lower to upper parts of the chamber, the directions of flows of the subject gas and regenerating gas are opposite to each other; in this case, to increase the flow rate of regenerating gas, the area of the blowing hole is set at normally 1/60 to 1/720, preferably 1/100 to 1/360 of the area of the catalyst bed.

Figure 5:
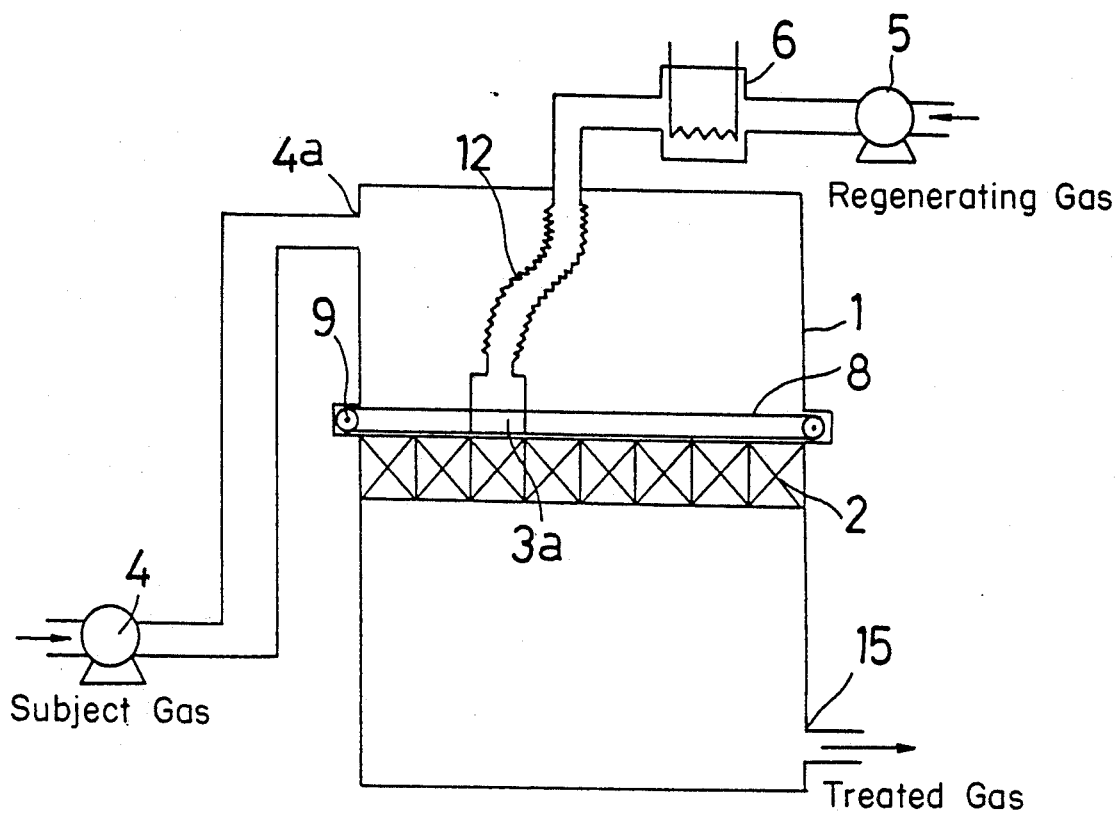
FIG. 5 is a schematic diagram of a treating apparatus incorporating a square catalyst bed with partitions therein.

FIG. 5 exemplifies the use of a square catalyst bed 2, in which unlike the example of FIG. 1. The catalyst bed 2 is configured with appropriately partitioned sections packed with grains or balls of catalyst. The blowing hole for regenerating gas 3a moves sequentially from section to section and returns to the starting position in a given cycle.

FIGS. 6 through 10 exemplify the modification of FIGS. 1 through 5, in which an ozone- and/or oxygen-enriched gas is used for regenerating the catatyst. High concentration ozone and/or oxygen is introduced through those inlet 13 and transferred through a feeding pipe to a position close to the catalyst bed 2 of the regenerating portion and blown to the catalyst bed 2 through the blowing slit 13a for high concentration ozone and/or oxygen. In this way, it becomes possible to feed high concentration of ozone and/or oxygen to ensure efficient progress of regeneration of the catalyst bed.

Figure 11:
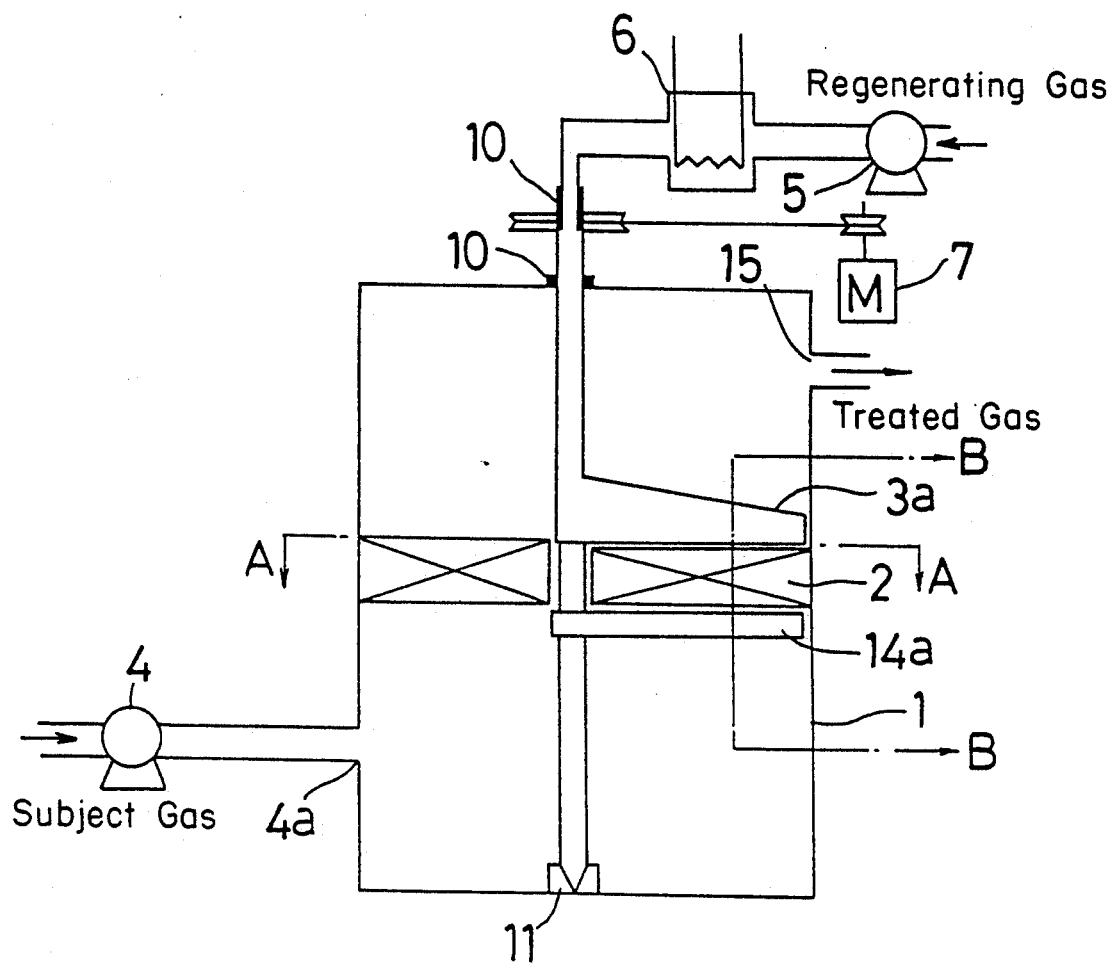
FIG. 11 is a schematic diagram of a treating apparatus incorporating a reversion pan.

FIG. 11 shows the method in which the direction of flow of regenerating gas is reversed by the reversion pan 14a which moves along with the blowing hole for regenerating gas 3a, after which the regenerating gas again passes through the catalyst bed 2.

Figures 12A, 12B:
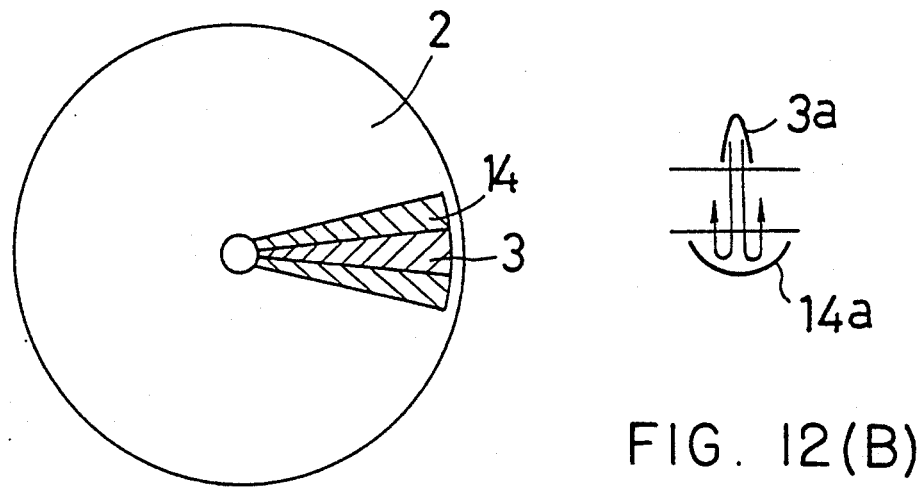
FIGS. 12(A) and 12(B) show a schematic diagram of a cross sectional view of FIG. 11 on the A—A line (A) and a schematic diagram of the flow of regenerating gas on a cross portion of FIG. 11 on the B—B line (B).

FIG. 12(A) is a schematic diagram of a cross sectional view of FIG. 11 on the A—A line; FIG. 12(B) is a schematic diagram of a cross sectional view of FIG. 11 on the B—B line, which schematically shows the flow of regenerating gas.

Figure 13:
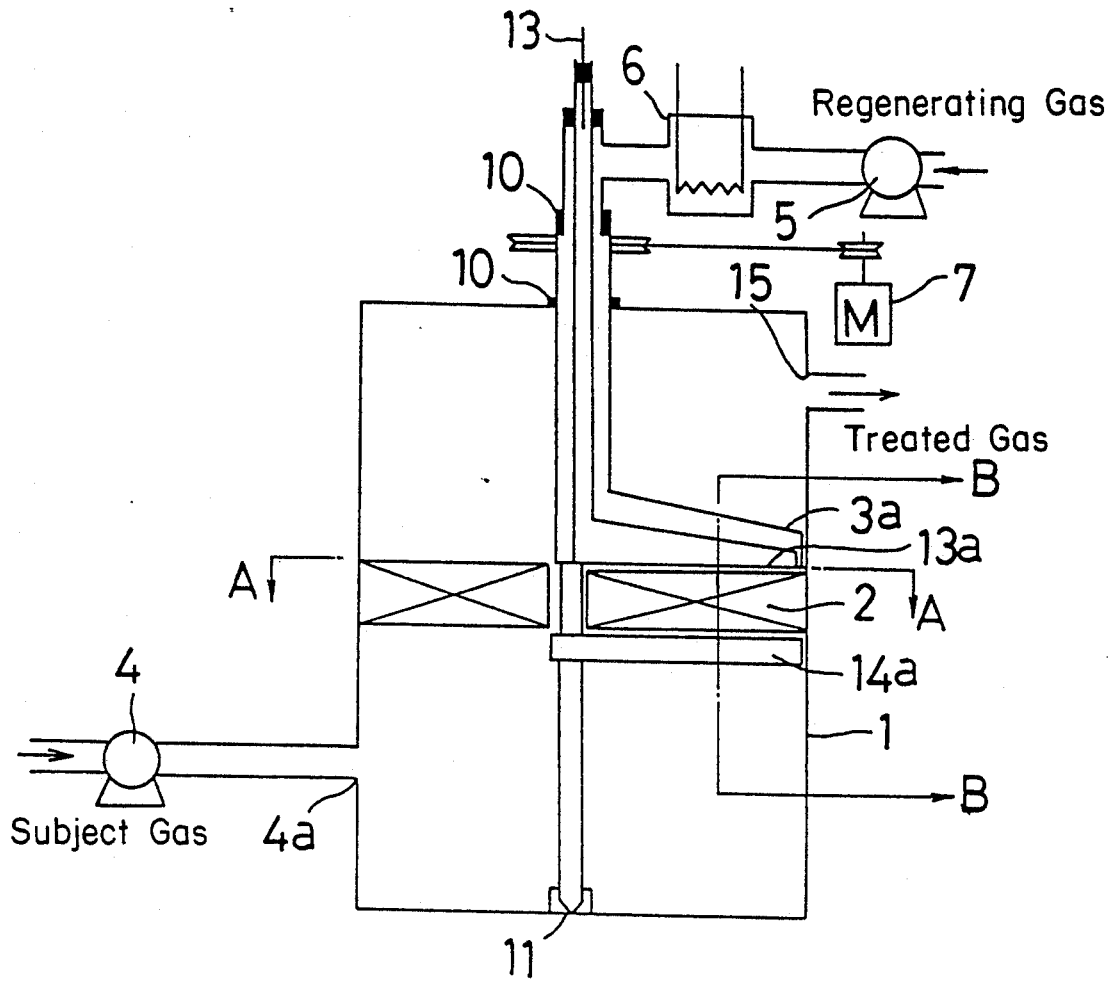
FIG. 13 is a schematic diagram of a treating apparatus which incorporates a reversion pan and which uses an oxygen- or ozone-enriched gas.

FIG. 13 exemplifies the modification of the example of FIG. 11, in which high concentration ozone and/or oxygen is blown through the blowing slit 13a provided at the inside of the blowing hole for regenerating gas 3a.

Figures 14, 14B:
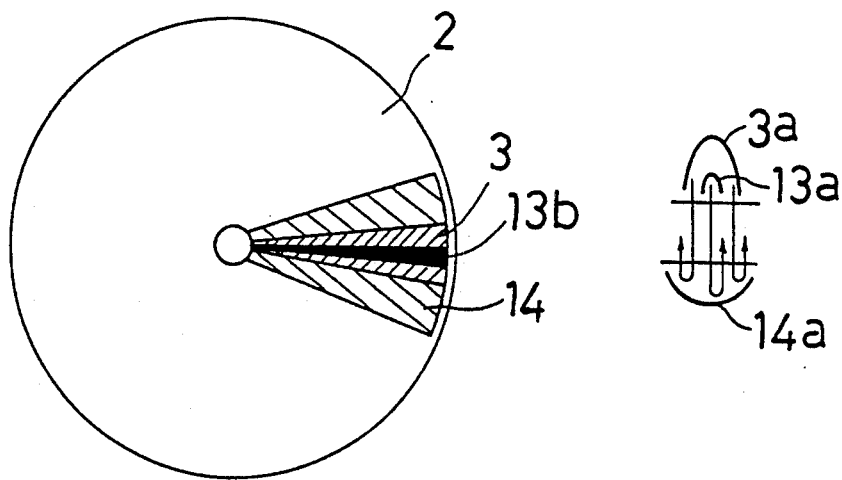

FIG. 14(A) is a schematic diagram of a cross sectional view of FIG. 13 on the A—A line; FIG. 14(B) is a schematic diagram of a cross sectional view of FIG. 13 on the B—B line, which schematically shows the flows of regenerating gas and high concentration ozone and/or oxygen.

Figure 15:
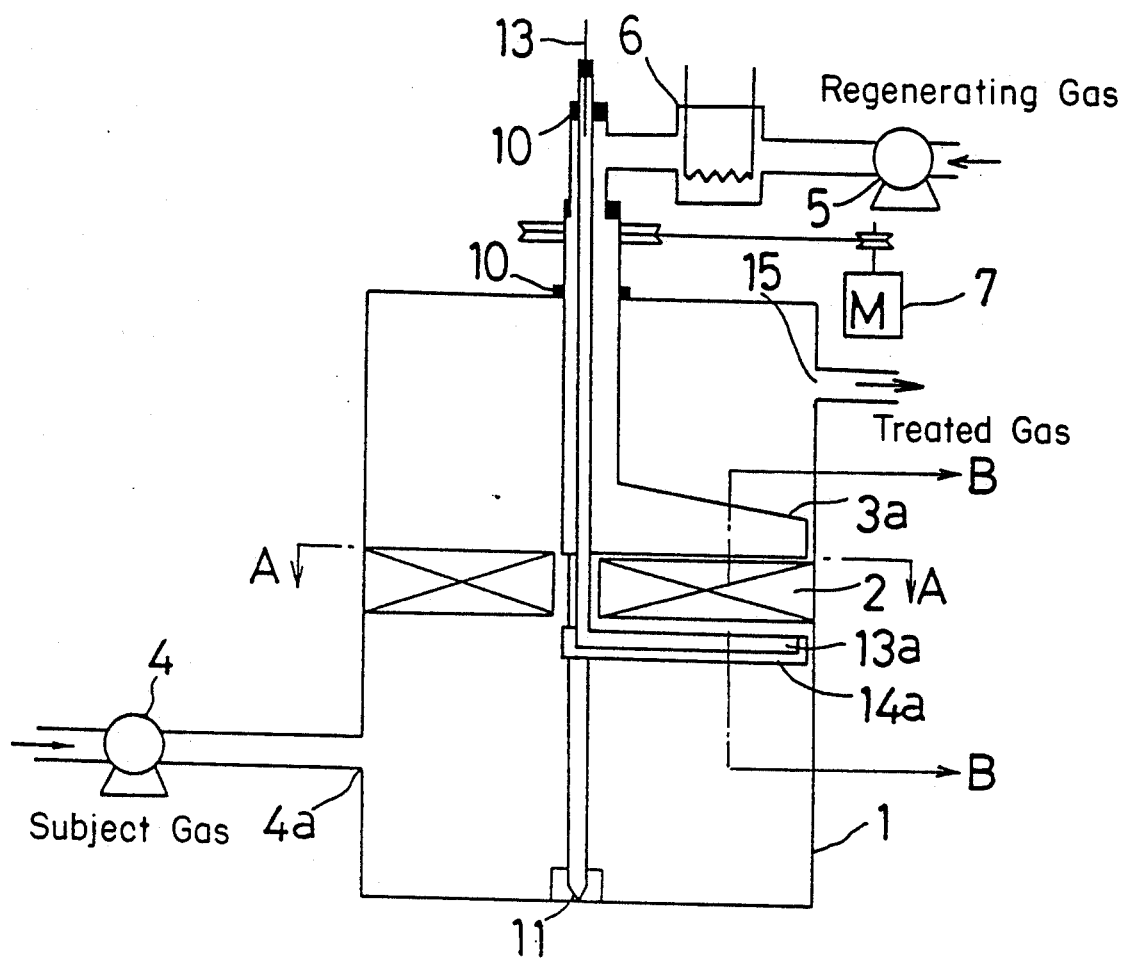
FIG. 15 is a schematic diagram of a treating apparatus which incorporates a reversion pan and the blowing slit for high concentration ozone and/or oxygen provided at the inside of said pan.

FIG. 15 shows a modification of the example of FIG. 11, in which high concentration ozone and/or oxygen is introduced from inlet 13 through a feeding pipe into the reversion pan 14a. The blowing slit 13a provided at the inside of the reversion pan 14a.

Figure 16A:
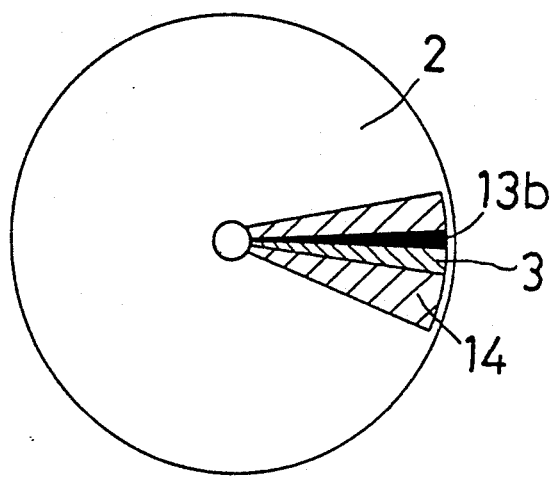
FIGS. 16(A) and 16(B) show a schematic diagram of a cross sectional view of FIG. 15 on the A—A line (A) and a schematic diagram of the flow of regenerating gas and high concentration ozone and/or oxygen on a cross portion of FIG. 15 on the B—B line (B).
Figure 16B:
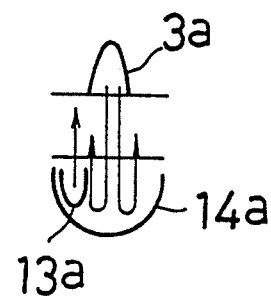

FIG. 16(A) is a schematic diagram of a cross sectional view of FIG. 15 on the A—A line; FIG. 16(B) is a schematic diagram of a cross sectional view of FIG. 15 on the B—B line, which schematically shows the flows of regenerating gas and high concentration ozone and/or oxygen.

By carrying out the method for treating a gas of the present invention using the gas treating apparatus of the present invention, it is possible to continuously, efficiently and economically advantageously treat a gas containing a malodorous component, harmful component, organic solvent, hydrocarbon vapor or the like.

EXAMPLES

The present invention is hereinafter described in more detail by means of the following examples.

Example 1

Gas treatment was carried out using the apparatus illustrated in FIG. 1. A honeycomb catalyst carrying manganese oxide ($MnO_2/TiO_2.SiO_2$, produced by Nippon Shokubai) was used to form a catalyst bed (square, 150 mm×200 mm×50 mm H, 210 cell/(inch)$^2$), and room temperature air containing 20 ppm pyridine as the subject gas was passed through the catalyst bed at a space velocity of 20000 (1/hr) to adsorb the pyridine thereto. To the catalyst bed which had adsorbed pyridine, regeneration air at 240° C. was blown at a flow volume of 1/10 of that of the subject gas through a blowing hole having an outlet cross section of 150 mm×20 mm provided at 1 mm above the catalyst bed to decompose the adsorbable substance and regenerate the catalyst. The speed of motion of the blowing hole for regenerating air above the catalyst bed was 1 reciprocal sliding cycle per 2 hours.

The exhaust gas resulting from treatment was analyzed using a detecting tube; no pyridine was detected in the exhaust gas.

Example 2

Gas treatment was carried out using the apparatus illustrated in FIG. 3. A honeycomb catalyst carrying manganese oxide ($MnO_2/TiO_2.SiO_2$, produced by Nippon Shokubai) was used to form a catalyst bed (circular, 200 mm $\phi$.×50 mm H, 210 cell/(inch)$^2$), and room temperature air containing 20 ppm phenol as the subject gas was passed through the catalyst bed at a space velocity of 20000 (1/hr) to adsorb the phenol thereto. To the catalyst bed which had adsorbed phenol, regeneration air at 330° C. was blown at a flow volume of 1/5 of that of the subject gas through a fan-shaped blowing hole having an outlet cross sectional radius of 100 mm and a central angle of 36° provided at 1 mm above the catalyst bed to decompose the adsorbable substance and regenerate the catalyst. The speed of motion of the blowing hole for regenerating air above the catalyst bed was 1 rotational cycle per 1.5 hours.

The exhaust gas resulting from treatment was analyzed using a detecting tube; no phenol was detected in the exhaust gas.

Example 3

Gas treatment was carried out using the apparatus illustrated in FIG. 3. A honeycomb catalyst carrying platinum (0.2% $Pt/Al_2O_3$, produced by N. E. Chemcat) was used to form a catalyst bed (circular, 200 mm $\phi$.×50 mm H, 210 cell/(inch)$^2$), and room temperature air containing 20 ppm acetic acid as the subject gas was passed through the catalyst bed at a space velocity of 2000 (1/hr) to adsorb the acetic acid thereto. To the catalyst bed which had adsorbed acetic acid, regeneration air at 300° C. was blown at a flow volume of 1/5 of that of the subject gas through a fan-shaped blowing hole having an outlet cross sectional radius of 100 mm and a central angle of 36° provided at 1 mm above the catalyst bed to decompose the adsorbable substance and regenerate the catalyst. The speed of motion of the blowing hole for regenerating air above the catalyst bed was 1 rotational cycle per 2.0 hours.

The exhaust gas resulting from treatment was analyzed by gas chromatography; no acetic acid was detected in the exhaust gas.

from section to section at a speed of 1 reciprocal cycle per hour.

The exhaust gas resulting from treatment was analyzed by gas chromatography; no propionic acid was detected in the exhaust gas.

TABLE 1

| | Subject gas | | | | Catalyst bed | | Regenerating air | | Motion cycle of blowing hole Hr | Conc. of treated adsorbable substance |
|---|---|---|---|---|---|---|---|---|---|---|
| Ex. | Adsorbable substance | Conc. ppm | O$_3$− Conc. ppm | Space velocity 1/Hr | Catalyst | shape | size mmH | Ratio to subject gas | Temp. °C. | | |
| 1 | pyridine | 20 | — | 20000 | manganese oxide | square | 150 × 200 × 50 | 1/10 | 240 | 2.0 | Not detected |
| 2 | phenol | 20 | — | 20000 | manganese oxide | circle | 200 φ × 50 | 1/5 | 330 | 1.5 | " |
| 3 | acetic acid | 20 | — | 20000 | platinum | circle | 200 φ × 50 | 1/5 | 300 | 2.0 | " |
| 4 | acetoaldehyde | 15 | 30 | 20000 | manganese oxide | square | 150 × 200 × 50 | 1/10 | 300 | 1.0 | " |
| 5 | ammonia | 10 | 10 | 10000 | manganese oxide | circle | 200 φ × 50 | 1/5 | 240 | 2.0 | " |
| 6 | propionic acid | 15 | — | 20000 | platinum | square | 150 × 200 × 50 | 1/10 | 300 | 1.0 | " |

Examples 4 through 5

Using the apparatus illustrated in FIG. 1 or 3, ozone was previously added to the subject gas containing an adsorbable substance listed in Table 1 to be a concentration shown in Table 1, followed by treatment under the conditions shown in Table 1. The exhaust gas resulting from treatment was analyzed using a detecting tube; no adsorbable substance was detected in the exhaust gas in any case.

Example 6

Gas treatment was carried out using the apparatus illustrated in FIG. 5. A catalyst bed of 150 mm×200 mm×50 mm H was divided into 10 equal sections in parallel to the direction of flow of the subject gas. Each section was packed with 1350 ml of grains of alumina catalyst carrying platinum (2 mm φ, 0.2% Pt/Al$_2$O$_3$, produced by N. E. Chemcat) to form a catalyst bed. Room temperature air containing 15 ppm propionic acid as the subject gas was passed through the catalyst bed at a space velocity of 20000 (1/hr) to adsorb the propionic acid thereto. To the catalyst bed which had adsorbed propionic acid, regenerating air at 300° C. was blown at a flow volume of 1/10 of that of the subject gas through a blowing hole having an outlet cross section of 150 mm×20 mm provided at 1 mm above the catalyst bed to decompose the adsorbable substance and regenerate the catalyst. The blowing hole for regenerating air was moved above the catalyst bed sequentially

Example 7

The subject gas containing 20 ppm pyridine was treated in the same manner as in Example 1 except that ozone-enriched air containing ozone obtained by mixing regenerating air with air containing 3000 ppm of ozone at a flow volume of 1/100 of that of regenerating air was used as a regenerating gas in place of the regenerating air used in Example 1, and that the regenerating gas had a temperature of 200° C. The exhaust gas resulting from treatment was analyzed using a detecting tube; no pyridine was detected in the exhaust gas.

Examples 8 through 11

Using the apparatus illustrated in FIG. 1 or 3, the subject gas containing an adsorbable substance or the subject gas obtained by previously adding ozone thereto (listed in Table 2) was treated with an ozone- or oxygen-enriched regenerating gas under the treating conditions shown in Table 2 in the same manner as in Example 7. The exhaust gas resulting from treatment was analyzed by gas chromatography; no adsorbable substance was detected in the exhaust gas in any case.

Example 12

Gas treatment was carried out using the apparatus illustrated in FIG. 5. The subject gas containing 15 ppm propionic acid was treated in the same manner as in Example 6 except that oxygen-enriched air prepared by blowing 99% oxygen at a flow volume of 1/10 of that of the regenerating air was used as a regenerating gas in place of the regenerating air used in Example 6, and that the regenerating gas had a temperature of 240° C. The exhaust gas resulting from treatment was analyzed by gas chromatography; no propionic acid was detected in the exhaust gas.

TABLE 2

| | Subject gas | | | | Catalyst bed | | |
|---|---|---|---|---|---|---|---|
| Ex. | Adsorbable substance | Conc. ppm | O$_3$− Conc. ppm | Space velocity (l/Hr) | Catalyst | shape | size mmH |
| 7 | pyridine | 20 | — | 20000 | manganese oxide | square | 150 × 200 × 50 |
| 8 | phenol | 20 | — | 20000 | manganese oxide | circle | 200 φ × 50 |
| 9 | acetic acid | 20 | — | 20000 | platinum | circle | 200 φ × 50 |
| 10 | acetoal- | 15 | 30 | 20000 | manganese | square | 150 × 200 × 50 |

TABLE 2-continued

| Ex. | | | | | | | | |
|---|---|---|---|---|---|---|---|---|
| 11 | dehyde ammonia | 10 | 10 | 10000 | manganese oxide | circle | 200 φ × 50 | |
| 12 | propionic acid | 15 | — | 20000 | platinum | square | 150 × 200 × 50 | |

| | Regenerating gas | | | | Motion | Conc. of |
|---|---|---|---|---|---|---|
| | Regenerating air | | $O_2$ or $O_3$ gas | | cycle of | treated |
| Ex. | Ratio to subject gas | Temp. °C. | $O_2/O_3$ | Ratio to regenerating air | blowing hole Hr | adsorbable substance |
| 7 | 1/10 | 200 | $O_3$ | 1/100 | 2.0 | Not detected |
| 8 | 1/5 | 250 | $O_3$ | 1/200 | 1.5 | " |
| 9 | 1/5 | 270 | $O_2$ | 1/5 | 2.0 | " |
| 10 | 1/10 | 240 | $O_2$ | 1/10 | 1.0 | " |
| 11 | 1/5 | 210 | $O_3$ | 1/200 | 2.0 | " |
| 12 | 1/10 | 240 | $O_2$ | 1/10 | 1.0 | " |

1) $O_2$: purity 99%
2) $O_3$: conc. 3000 ppm

Example 13

Figure 6:
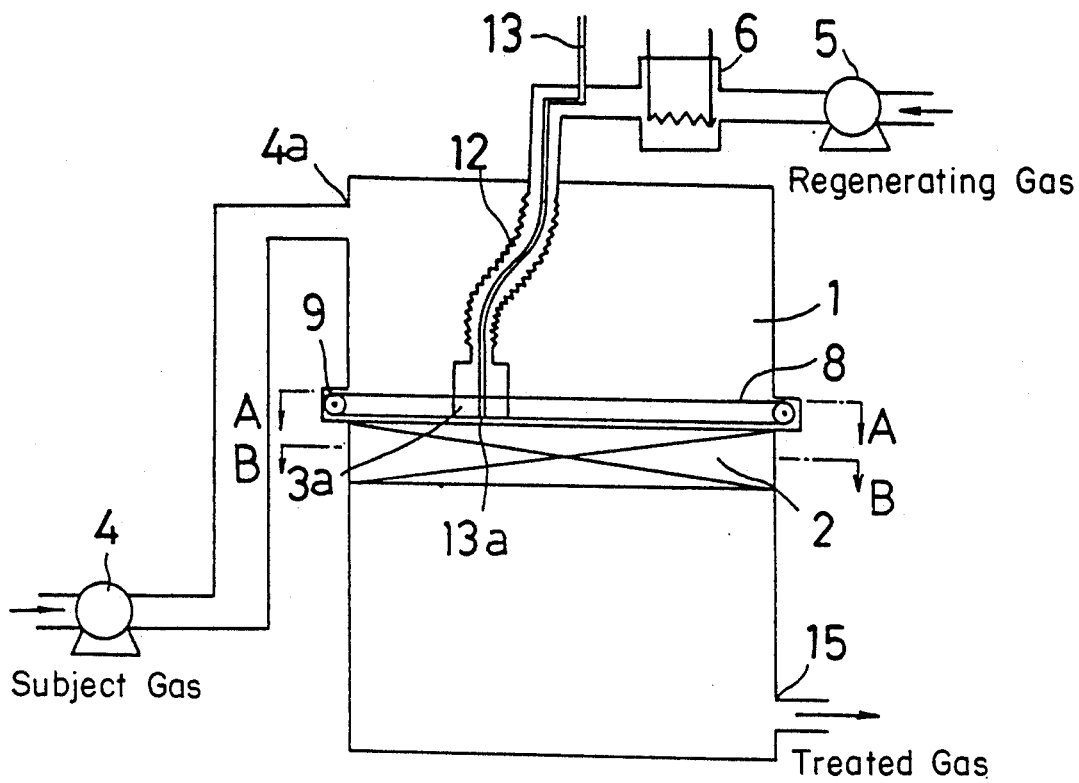
FIG. 6 is a schematic diagram of a treating apparatus which incorporates a square catalyst bed and which uses an oxygen- or ozone-enriched gas.
Figure 7A:
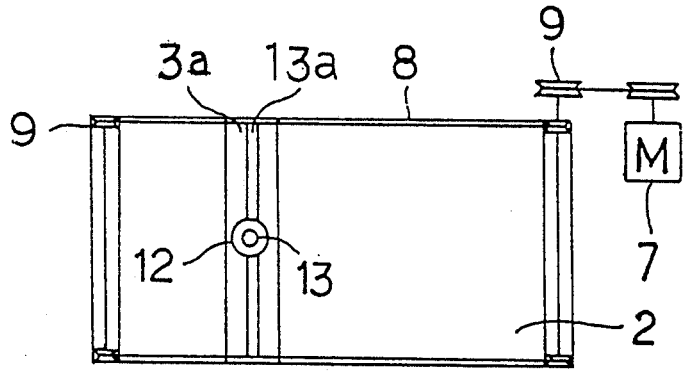
FIGS. 7(A) and 7(B) are schematic diagrams of cross sectional views of FIG. 6 on the A—A line (A) and the B—B line (B)
Figure 7B:
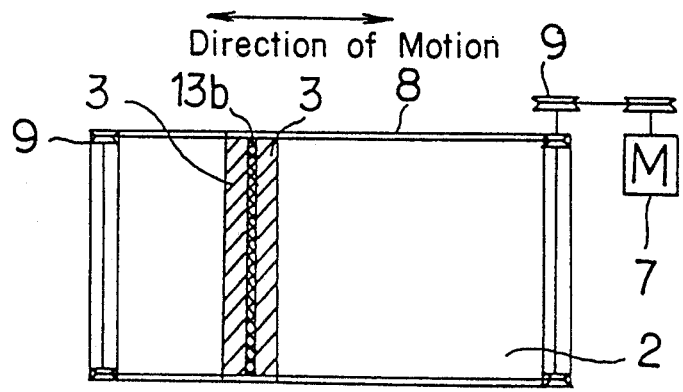

Gas treatment was carried out using the apparatus illustrated in FIG. 6. An adsorbable substance was decomposed by blowing regenerating air and introducing and blowing 3000 ppm ozone gas through a feeding pipe to a position 1 mm apart from the catalyst bed in place of the regenerating ozone-enriched gas prepared by previously mixing ozone with regenerating air in Example 7. Using the apparatus described above and the same subject gas as in Example 7, the subject gas was treated in the same manner as in Example 7 except that the regenerating air had a temperature of 190° C.

Ozone gas was blown through a blowing slit with a cross sectional area of 1/10 of the cross sectional area of the blowing hole for regenerating gas provided at the inside of the blowing hole for regenerating gas.

The exhaust gas resulting from treatment was analyzed using a detecting tube; no pyridine was detected in the exhaust gas.

Examples 14 through 17

Figure 8:
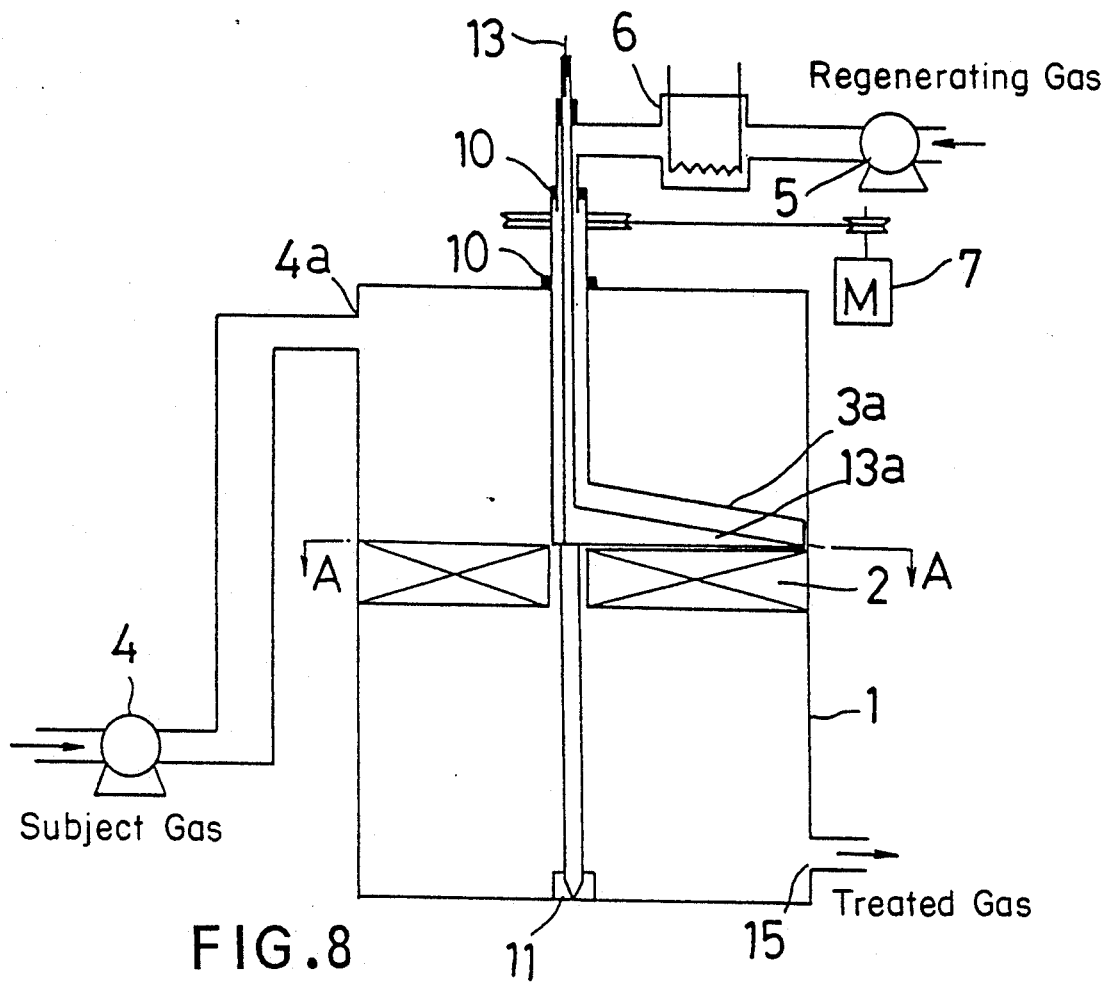
FIG. 8 is a schematic diagram of a treating apparatus which incorporates a circular catalyst bed and which uses an oxygen- or ozone-enriched gas.
Figure 9:
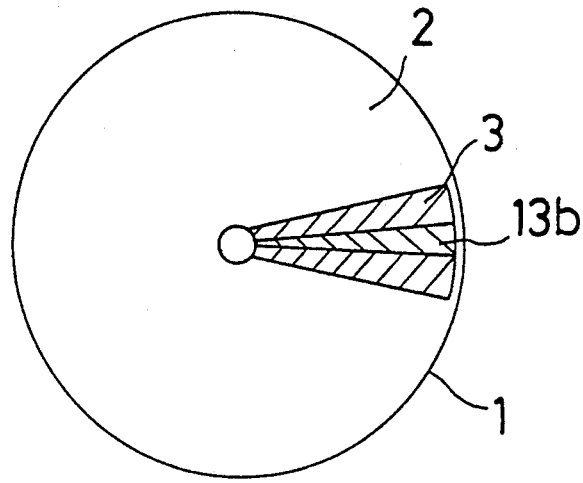
FIG. 9 is a schematic diagram of a cross sectional view of FIG. 8 on the A—A line.

Using the apparatus illustrated in FIG. 6 or 8, the subject gas containing an adsorbable substance or the subject gas obtained by previously adding ozone thereto (listed in Table 3) was treated under the treating conditions shown in Table 3 in the same manner as in Example 13. An adsorbable substance was decomposed by blowing regenerating air and introducing and blowing ozone or oxygen gas through a feeding pipe to a position 1 mm apart from the catalyst bed. The exhaust gas resulting from treatment was analyzed using a detecting tube or by gas chromatography; no adsorbable substance was detected in the exhaust gas in any case.

Example 18

Figure 10:
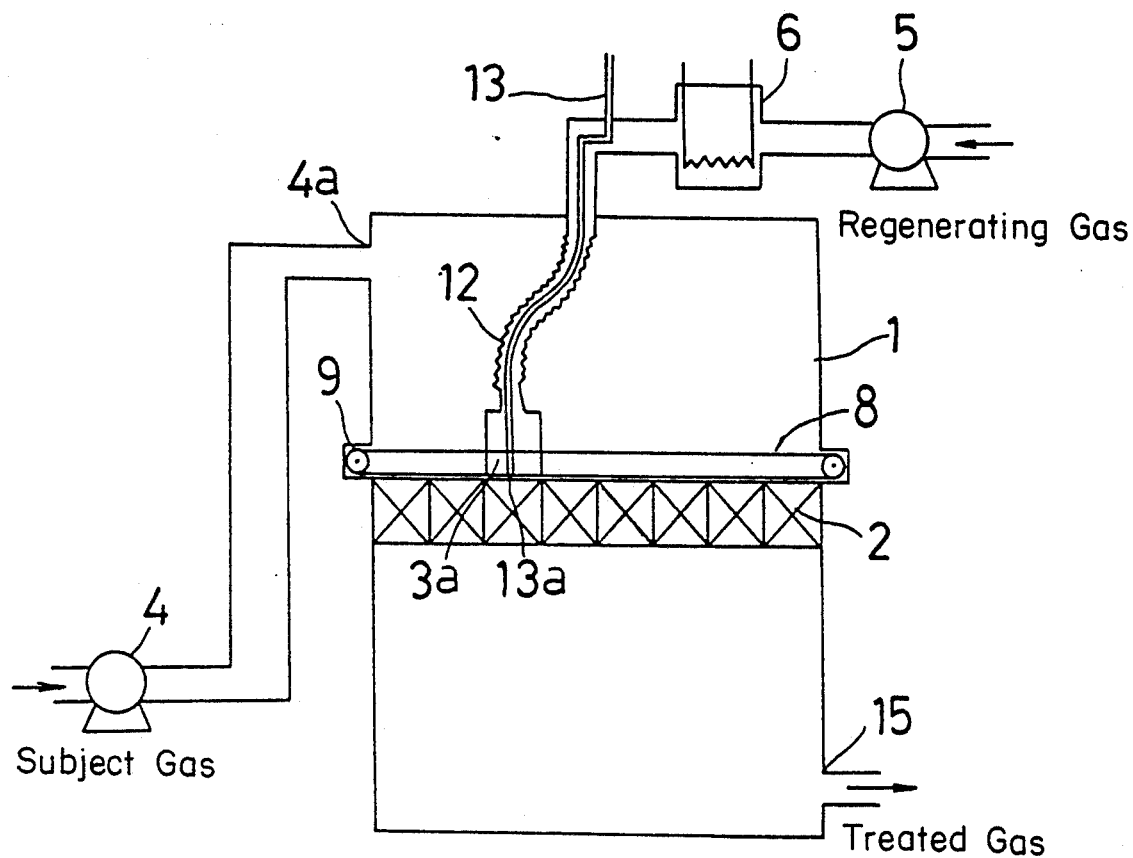
FIG. 10 is a schematic diagram of a treating apparatus which incorporates a square catalyst bed with partitions therein and which uses an oxygen- or ozone-enriched gas.

Gas treatment was carried out using the apparatus illustrated in FIG. 10. An adsorbable substance was decomposed by blowing regenerating air and introducing and blowing oxygen through a feeding pipe to a position 1 mm apart from the catalyst bed in place of the regenerating oxygen-enriched gas prepared by previously mixing oxygen with regenerating air in Example 12. Using the apparatus described above and the same subject gas as in Example 12, the subject gas containing 15 ppm propionic acid was treated in the same manner as in Example 12 except that the regenerating air had a temperature of 230° C.

Oxygen was blown through a blowing slit with a cross sectional area of 1/10 of the cross sectional area of the blowing hole for regenerating gas provided at the inside of the blowing hole for regenerating gas.

The exhaust gas resulting from treatment was analyzed by gas chromatography; no propionic acid was detected in the exhaust gas.

TABLE 3

| | Subject gas | | | | Catalyst bed | | |
|---|---|---|---|---|---|---|---|
| Ex. | Adsorbable substance | Conc. ppm | $O_3$— Conc. ppm | Space velocity (l/Hr) | Catalyst | shape | size mmH |
| 13 | pyridine | 20 | — | 20000 | manganese oxide | square | 150 × 200 × 50 |
| 14 | phenol | 20 | — | 20000 | manganese oxide | circle | 200 φ × 50 |
| 15 | acetic acid | 20 | — | 20000 | platinum | circle | 200 φ × 50 |
| 16 | acetoaldehyde | 15 | 30 | 20000 | manganese oxide | square | 150 × 200 × 50 |
| 17 | ammonia | 10 | 10 | 10000 | manganese oxide | circle | 200 φ × 50 |
| 18 | propionic acid | 15 | — | 20000 | platinum | square | 150 × 200 × 50 |

| | Regenerating gas | | | | Motion | Conc. of |
|---|---|---|---|---|---|---|
| | Regenerating air | | $O_2$ or $O_3$ gas | | cycle of | treated |
| Ex. | Ratio to subject gas | Temp. °C. | $O_2/O_3$ | Ratio to regenerating air | blowing hole Hr | adsorbable substance |
| 13 | 1/10 | 190 | $O_3$ | 1/100 | 2.0 | Not detected |
| 14 | 1/5 | 240 | $O_3$ | 1/200 | 1.5 | " |
| 15 | 1/5 | 240 | $O_2$ | 1/5 | 2.0 | " |
| 16 | 1/10 | 230 | $O_2$ | 1/10 | 1.0 | " |

TABLE 3-continued

| 17 | 1/5 | 200 | $O_3$ | 1/200 | 2.0 | " |
| 18 | 1/10 | 230 | $O_2$ | 1/10 | 1.0 | " |

1) $O_2$: purity 99%
2) $O_3$: conc. 3000 ppm

Example 19

Gas treatment was carried out using an apparatus having the same mechanism as of the apparatus illustrated in FIG. 3 except that the subject gas flowed from the lower part of the chamber. A honeycomb catalyst carrying manganese oxide ($MnO_2/TiO_2.SiO_2$, produced by Nippon Shokubai) was used to form a catalyst bed (circular, 200 mm $\phi. \times 50$ mm H, 210 cell/(inch)$^2$), and room temperature air containing 20 ppm phenol as the subject gas was passed through the catalyst bed at a space velocity of 20000 (1/hr) to adsorb the phenol thereto. To the catalyst bed which had adsorbed phenol, the regenerating air at 330° C. was blown at a flow volume of 1/5 of that of the subject gas in the direction opposite to the direction of the subject gas through a fan-shaped blowing hole having an outlet cross sectional radius of 100 mm and a central angle of 1.8° to decompose the adsorbable substance and regenerate the catalyst. The speed of motion of the blowing hole for regenerating air above the catalyst bed was 1 rotational cycle per 1.5 hours.

The exhaust gas resulting from treatment was analyzed using a detecting tube; no phenol was detected in the exhaust gas.

Example 20

The subject gas containing 20 ppm phenol was treated in the same manner as in Example 19 except that ozone-enriched air containing ozone obtained by mixing regenerating air with air containing 3000 ppm of ozone at a flow volume of 1/200 of that of regenerating air was used as a regenerating gas in place of the regenerating air used in Example 19, and that the regenerating gas had a temperature of 250° C. The exhaust gas resulting from treatment was analyzed using a detecting tube; no phenol was detected in the exhaust gas.

Example 21

Gas treatment was carried out using an apparatus having the same mechanism as of the apparatus illustrated in FIG. 8 except that the subject gas flowed from the lower part of the chamber.

Phenol was decomposed by blowing regenerating air and introducing and blowing 3000 ppm ozone gas through a feeding pipe to a position 1 mm apart from the catalyst bed in place of the regenerating ozone-enriched gas prepared by previously mixing ozone with regenerating air in Example 20. Ozone gas was blown through a blowing slit with a cross sectional area of 1/10 of the cross sectional area of the blowing hole for regenerating gas provided at the inside of the blowing hole for regenerating gas.

Using the apparatus and method described above, the subject gas containing 20 ppm phenol was treated in the same manner as in Example 20 except that the regenerating air had a temperature of 240° C.

The exhaust gas resulting from treatment was analyzed using a detecting tube; no phenol was detected in the exhaust gas.

Example 22

Gas treatment was carried out using the apparatus illustrated in FIG. 11.

To the catalyst bed to which phenol had been adsorbed in Example 19, regeneration air at 330° C. was blown at a flow volume of 1/10 of that of the subject gas in the direction opposite to the direction of flow of the subject gas through a fan-shaped blowing hole having an outlet cross sectional radius of 100 mm and a central angle of 1.8° and the regenerating gas after passing through the catalyst bed was reversed by a fan-shaped reversion pan having a radius of 100 mm and a central angle of 18° to pass it in the same direction as the direction of flow of the subject gas, whereby the adsorbable substance was decomposed and the catalyst was regenerated. The subject gas containing 20 ppm phenol was treated in the same manner as in Example 19 except that the apparatus described above was used.

The exhaust gas resulting from treatment was analyzed using a detecting tube; no phenol was detected in the exhaust gas.

Example 23

The subject gas containing 20 ppm phenol was treated in the same manner as in Example 22 except that ozone-enriched air containing ozone obtained by mixing regenerating air with air containing 3000 ppm of ozone at a flow volume of 1/200 of that of regenerating air was used as a regenerating gas in place of the regenerating air used in Example 22, and that the regenerating gas had a temperature of 250° C. The exhaust gas resulting from treatment was analyzed using a detecting tube; no phenol was detected in the exhaust gas.

Example 24

Gas treatment was carried out using the apparatus illustrated in FIG. 13. An adsorbable substance was decomposed by blowing regenerating air and introducing and blowing 3000 ppm ozone gas through a feeding pipe to a position 1 mm apart from the catalyst bed in place of the regenerating ozone-enriched gas prepared by previously mixing ozone with regenerating air in Example 23. Using the apparatus described above, the subject gas containing 20 ppm phenol was treated in the same manner as in Example 23 except that the regenerating air had a temperature of 240° C.

Ozone gas was blown through a blowing slit with a cross sectional area of 1/10 of the cross sectional area of the blowing hole for regenerating gas provided at the inside of the blowing hole for regenerating gas.

The exhaust gas resulting from treatment was analyzed using a detecting tube; no phenol was detected in the exhaust gas.

Example 25

Gas treatment was carried out using the apparatus illustrated in FIG. 15. The subject gas containing 20 ppm phenol was treated in the same manner as in Example 24 except that the blowing slit for ozone gas was provided at the inside of the reversion pan in place of providing it at the inside of the blowing hole for regenerating gas in Example 24.

The exhaust gas resulting from treatment was analyzed using a detecting tube; no phenol was detected in the exhaust gas.

In all examples described above, the passing of the subject gas through the catalyst bed, the adsorption of the adsorbable substances in the subject gas thereto, and the decomposition of the adsorbed substances and the regeneration of the catalyst bed by blowing the regenerating gas were carried out continuously and simultaneously in the apparatus of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for continuously treating a gas using an apparatus with a catalyst bed housed with an oxidation catalyst therein, the catalyst bed being located within a housing and the method comprising the steps of: passing a subject gas containing adsorbable substances selected from the group consisting of sulfides, amines, ketones, organic acids, aldehydes, phenols and alcohols through the catalyst bed to adsorb the adsorbable substances in the subject gas thereto; passing a regenerating gas through the catalyst bed to react and decompose said adsorbed substances and simultaneously regenerate the catalyst bed, wherein said regenerating gas is passed through a regenerating portion of the catalyst bed, said regenerating portion being formed by passing through the regenerating gas from a blowing hole for the regenerating gas; periodically moving the blowing hole above the catalyst bed to regenerated all of the catalyst bed, the blowing hole being periodically moved from portion to portion in one of a rotational movement and a sliding movement, the catalyst bed being fixed and nonmovable relative to the housing while the blowing hole is movable relative to both the catalyst bed and the housing; and reversing the flow of said regeneration gas and decomposition substances through the catalyst bed.

2. The method according to claim 1, wherein said subject gas is a gas supplemented with ozone.

3. The method according to claim 1, wherein said blowing hole moves rotationally.

4. The method according to claim 1, wherein said regenerating gas is a heated air or an exhaust gas resulting from the decomposing of the adsorbable substances.

5. The method according to claim 4, wherein a heated air or an exhaust gas resulting from the decomposing of the adsorbable substances is used as the regenerating gas together with a gas enriched with at least one of ozone and oxygen, the ozone being not less than 1 ppm and the oxygen being not less than 22%.

6. The method according to claim 4, further comprising the steps of introducing a gas enriched with at least one of not less than 1ppm ozone and not less than 22% oxygen as a part of the regenerating gas to a position not longer than 30 mm to the regenerating portion through a feeding pipe and blowing the gas to a part of the regenerating portion.

7. The method according to claim 1, wherein a heated air or an exhaust gas resulting from the decomposing of the adsorbable substances is used as the regenerating gas together with a gas enriched with at least one of ozone and oxygen, the ozone being not less than 1 ppm and the oxygen being not less than 22%.

8. The method according to claim 1, further comprising introducing a gas enriched with at least one of not less than 1 ppm ozone and not less than 22% oxygen as a part of the regenerating gas to a position not longer than 30 mm to the regenerating portion through a feeding pipe and blowing the gas to a part of the regenerating portion.

9. The method according to claim 1, wherein said catalyst bed comprises a honeycomb base carrying a catalyst.

10. The method according to claim 1, wherein said catalyst bed comprises cells partitioned generally in parallel to the direction of flow of the gas and filled with grains or balls of catalyst.

11. The method according to claim 1, wherein the direction of flow of said regenerating gas is the same as that of said subject gas.

12. The method according to claim 1, wherein the direction of flow of said regenerating gas is opposite to that of said subject gas.

13. The method according to claim 1, further comprising the steps of passing said regenerating gas through the catalyst bed in the direction opposite to the direction of flow of the subject gas, and then passing the regenerating gas again in the same direction through the catalyst bed by reversing the direction of flow to the same direction as the direction of flow of the subject gas using a reversion pan provided at the opposite side of the catalyst bed to the blowing hole for regenerating gas, and moving the reversion pan along with the blowing hole for the regenerating gas.

14. The method according to claim 1, wherein said blowing hole moves slidably.

* * * * *